(12) United States Patent
Mase et al.

(10) Patent No.: US 11,194,026 B2
(45) Date of Patent: Dec. 7, 2021

(54) LIGHT DETECTION DEVICE

(71) Applicant: HAMAMATSU PHOTONICS K.K., Hamamatsu (JP)

(72) Inventors: Mitsuhito Mase, Hamamatsu (JP); Keiki Taguchi, Hamamatsu (JP); Hajime Ishihara, Hamamatsu (JP); Hiroo Yamamoto, Hamamatsu (JP); Akihiro Shimada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 57 days.

(21) Appl. No.: 16/846,823

(22) Filed: Apr. 13, 2020

(65) Prior Publication Data

US 2021/0318417 A1    Oct. 14, 2021

(51) Int. Cl.
*G01S 7/4863* (2020.01)
*G01S 17/10* (2020.01)

(52) U.S. Cl.
CPC ............ *G01S 7/4863* (2013.01); *G01S 17/10* (2013.01)

(58) Field of Classification Search
CPC .............................. G01S 7/4863; G01S 17/10
See application file for complete search history.

(56) References Cited

U.S. PATENT DOCUMENTS 4,913,546 A * 4/1990 Nagaoka ................. G01C 3/06
356/3.08
6,609,840 B2 * 8/2003 Chow ..................... H04B 10/69
398/102

FOREIGN PATENT DOCUMENTS

JP       2011-133464 A      7/2011

* cited by examiner

*Primary Examiner* — Seung C Sohn
(74) *Attorney, Agent, or Firm* — Faegre Drinker Biddle & Reath LLP (57) ABSTRACT

A light detection device includes a first photodiode, a second photodiode connected in series to the first photodiode, a first light source configured to output first pulsed light to which the first photodiode is sensitive, and a signal output unit configured to output a current as a detection signal, the current that flow through the second photodiode.

13 Claims, 5 Drawing Sheets

LIGHT DETECTION DEVICE

TECHNICAL FIELD

The present disclosure relates to a light detection device.

BACKGROUND

As a sensor that acquires a distance image of an object using an indirect time of flight (TOF) scheme, a distance image sensor including a semiconductor substrate provided with a photosensitive region, an insulating layer formed on the semiconductor substrate, and a photogate electrode and a transfer electrode formed on the insulating layer for each pixel is known (see, for example, Japanese Unexamined Patent Publication No. 2011-133464). In the example of the distance image sensor disclosed in Japanese Unexamined Patent Publication No. 2011-133464, the semiconductor substrate is formed of silicon, and the photogate electrode and the transfer electrode are formed of polysilicon.

SUMMARY

In recent years, a distance image sensor that can be detect light having a wavelength of approximately 1.5 μm has been required for acquiring a distance image of an object, for example, in fog or smoke. However, in a case where a semiconductor substrate constituting the distance image sensor is formed of silicon, it is not possible to obtain sufficient sensitivity to light having a wavelength of approximately 1.5 μm. Consequently, in order to obtain sufficient sensitivity to light having a wavelength of approximately 1.5 μm, using a compound semiconductor substrate for the semiconductor substrate constituting the distance image sensor can be considered. However, in that case, it is difficult to form a photogate electrode and a transfer electrode on the compound semiconductor substrate.

In addition, performing control of output (control of transfer) of a detection signal in a CMOS provided at a latter stage of a distance image sensor can also be considered. However, since there is a limit to control of output of a detection signal on the order of μs in the CMOS, the control of output of a detection signal in the CMOS is insufficient for an indirect TOF scheme requiring control of output of a detection signal at a high speed such as on the order of several tens of ns.

An object of the present disclosure is to provide a light detection device that makes it possible to realize control of output of a detection signal at a high speed with a simple configuration.

A light detection device of an aspect of the present disclosure includes a first photodiode, a second photodiode connected in series to the first photodiode, a first light source configured to output first pulsed light to which the first photodiode is sensitive, and a signal output unit configured to output a current as a detection signal, the current that flow through the second photodiode.

DETAILED DESCRIPTION

Hereinafter, an embodiment of the present disclosure will be described in detail with reference to the accompanying drawings. Meanwhile, the same or equivalent portions in the drawings are denoted by the same reference numerals and signs, and thus description thereof will not be repeated.

Figure 1:
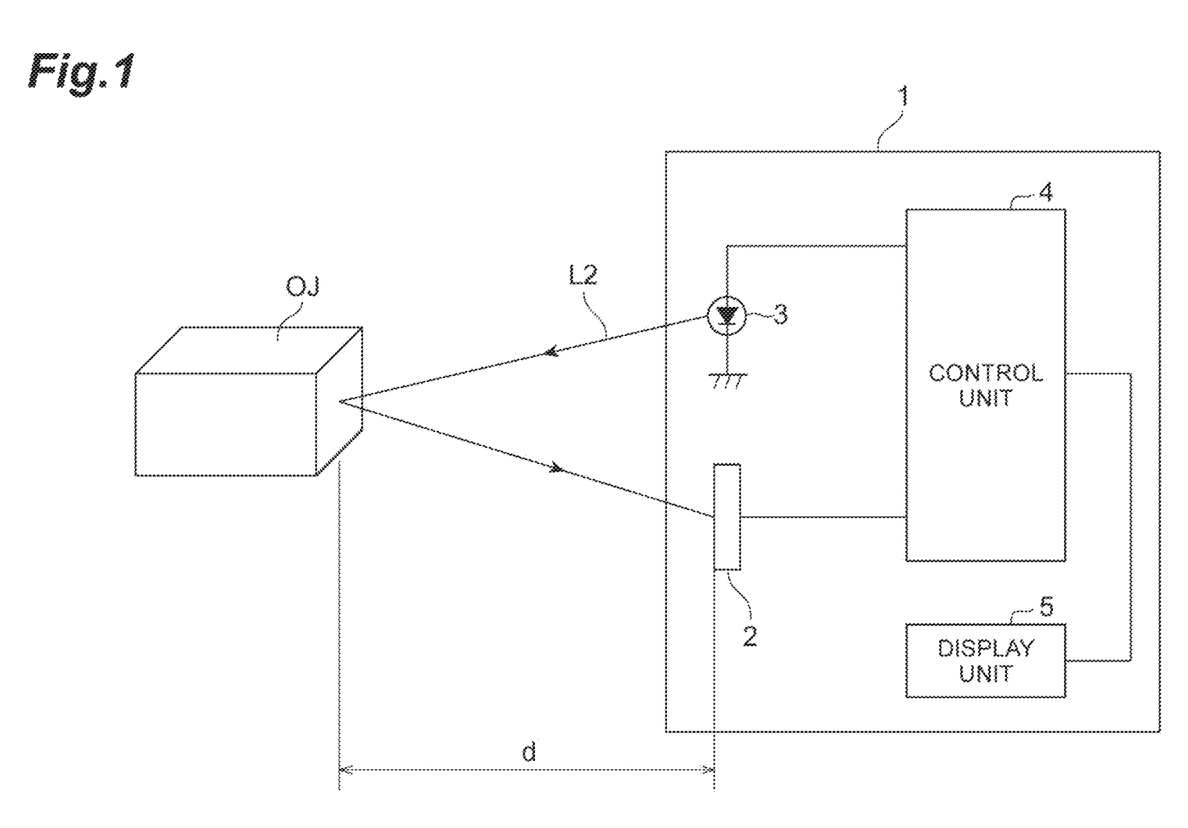
FIG. 1 is a configuration diagram of a light detection device of an embodiment.

As shown in FIG. 1, a light detection device 1 includes a light detection unit 2, a second light source 3, a control unit 4, and a display unit 5. The light detection device 1 is a device that acquires a distance image of an object OJ (an image including information relating to a distance d to an object OJ) using an indirect TOF scheme.

Figure 2:
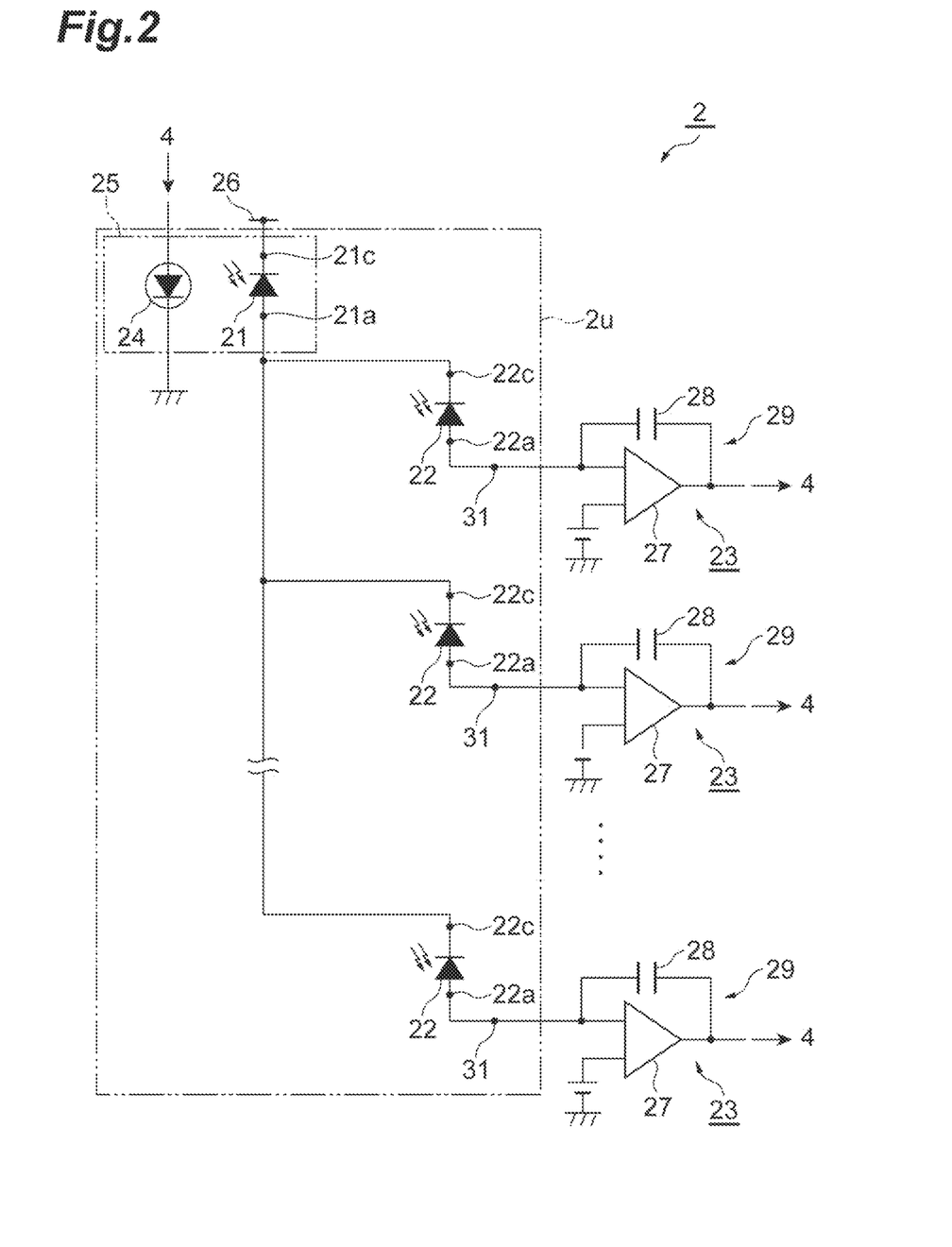
FIG. 2 is a configuration diagram of a portion of the light detection unit shown in FIG. 1.

As shown in FIG. 2, the light detection unit 2 includes a plurality of first PDs (first photodiodes) 21, a plurality of second PDs (second photodiodes) 22, a plurality of signal processing circuits (signal processing units) 23, a plurality of first light sources 24, and a plurality of housings 25. Meanwhile, FIG. 2 is a configuration diagram of a portion of the light detection unit 2, and thus one first PD 21, one first light source 24, and one housing 25 are shown in FIG. 2.

The plurality of second PDs 22 are arranged two-dimensionally (for example, in a matrix), and constitutes an area sensor. One first PD 21 is provided for every predetermined number of second PIs 22 out of the total number of second PDs 22. In the light detection unit 2, a plurality of light detection units 2u including one first PD 21 and the plurality of second PDs 22 connected to the one first PD 21 are constituted. Hereinafter, the configuration of the light detection unit 2 will be described focusing on one light detection unit 2u.

In the light detection unit 2, each of the plurality of second PDs 22 connected in parallel to each other is connected in series to one first PD 21. Specifically, a cathode electrode 22c of each of the plurality of second PDs 22 is connected to an anode electrode (second electrode) 21a of one first PD 21. In the present embodiment, a semiconductor substrate constituting the first PD 21 is a silicon substrate, and a semiconductor substrate constituting the second PD 22 is a compound semiconductor substrate. As an example, the first PD 21 is a Si photodiode, and the second PD 22 is an InGaAs photodiode.

A power supply 26 is connected to a cathode electrode (a first electrode) 21c of the first PD 21. The power supply 26 applies, for example, a positive voltage to thereby apply a reverse bias to the first PD 21 and the plurality of second PDs 22. A signal output unit 31 is connected to an anode electrode 22a of each of the plurality of second PDs 22, and a signal processing circuit 23 is connected to the signal output unit 31. The signal output unit 31 outputs a current that has flowed through the second PD 22 as a detection signal. The signal output unit 31 is, for example, an electrode pad connected to the anode electrode 22a of the second PD 22, or the like. The signal processing circuit 23 includes a charge amplifier 29 which is constituted by an operational amplifier 27 and a capacitor 28. One input end of the operational amplifier 27 is connected to the anode electrode 22a of the second PD 22. The other input end of the operational amplifier 27 is connected to a reference potential through a voltage application unit 20 that applies a reference voltage. The signal processing circuit 23 acquires a detection signal which is output from the signal output unit 31, and outputs an output voltage signal generated by amplification and conversion based on the reference voltage from the output end of the operational amplifier 27 to the control unit 4.

The first light source 24 outputs first pulsed light L1 to which the first PD 21 is sensitive (that is, by which photoelectric conversion can be generated in the first PD 21). The first light source 24 is a semiconductor laser or a light-emitting diode, and outputs the first pulsed light L1 at a frequency of 10 KHz or higher. In the present embodiment, the first light source 24 is, for example, an LED or the like, and outputs the first pulsed light L1 having a visible-region wavelength. The first PD 21 and the first light source 24 are accommodated in the housing 25. The housing 25 has a light-shielding property. In the housing 25, the first pulsed light L1 output from the first light source 24 is incident on the first PD 21. Meanwhile, the second PD 22 is disposed outside the housing 25. In addition, the center wavelength of light to which the second PD 22 is sensitive (that is, by which photoelectric conversion can be generated in the second PD 22) deviates from the center wavelength of light to which the first PD 21 is sensitive. However, a portion of the wavelength region of light to which the second PD 22 is sensitive may overlap a portion of the wavelength region of light to which the first PD 21 is sensitive.

As shown in FIG. 1, the second light source 3 outputs second pulsed light L2 to which the second PD 22 is sensitive. The second light source 3 is a semiconductor laser or a light-emitting diode, and outputs the second pulsed light L2 at a frequency of 10 KHz or higher. In the present embodiment, the second light source 3 is, for example, an infrared LED or the like, and outputs the second pulsed light L2 at a wavelength of approximately 1.5 µm. The object OJ is irradiated with the second pulsed light L2 output from the second light source 3, and the second pulsed light L2 reflected from the object OJ is incident on the plurality of second PDs 22 (see FIG. 2) of the light detection unit 2. The control unit 4 controls the light detection unit 2 and the second light source 3, generates a distance image of the object OJ on the basis of an output voltage signal which is output from the light detection unit 2, and causes the display unit 5 to display the generated distance image.

In the light detection device 1 configured in this manner, for a period in which an output value of the first pulsed light L1 is OFF in a state where the first PD 21 is irradiated with the first pulsed light L1, carriers (electrons and holes) are not generated in the first PD 21. Therefore, even when carriers have been generated in each of the plurality of second PDs 22 due to the incidence of the second pulsed light L2, a current does not flow through each of the plurality of second PDs 22. That is, for a period in which the output value of the first pulsed light L1 is OFF, it is possible not to output a current that has flowed through each of the plurality of second PDs 22 as a detection signal from the signal output unit 31 to the signal processing circuit 23. On the other hand, for a period in which the output value of the first pulsed light L1 is ON in a state where the first PD 21 is irradiated with the first pulsed light L1, carriers are generated in the first PD 21. Therefore, when carriers are generated in each of the plurality of second PDs 22 due to the incidence of the second pulsed light L2, a current flows through each of the plurality of second PDs 22. That is, for a period in which the output value of the first pulsed light L1 is ON, it is possible to output a current that has flowed through each of the plurality of second PDs 22 as a detection signal from the signal output unit 31 to the signal processing circuit 23. Here, the first pulsed light L1 can be modulated at a frequency of 10 KHz or higher. Thus, according to the light detection device 1, it is possible to realize control of output of a detection signal at a high speed with a simple configuration. Meanwhile, the output value of the first pulsed light L1 for the period of OFF is not limited to only 0 (that is, an output value equivalent to turn-off), and may be an output value lower than the output value of the first pulsed light L1 for the period of ON (that is, an output value equivalent to turn-on) and an output value for which carriers are not generated in the first PD 21.

Meanwhile, connecting a photodiode functioning as a switch to a photodiode for detection is not normally considered. This is because a switch is normally assumed to be an electrical circuit, a physical shutter or the like, and is not normally assumed to be an optical switch separately requiring a light source that outputs specific light. In addition, this is because the photodiode detects the intensity of light, and is normally assumed to be used while maintaining constant sensitivity. Further, this is because there is concern of light which is output from a light source for a photodiode functioning as a switch influencing a photodiode for detection.

In addition, in the light detection device 1, a detection signal which is output from the signal output unit 31 is acquired by the signal processing circuit 23. Thereby, it is possible to process (for example, amplify and convert) the detection signal which is output from the signal output unit 31.

In addition, in the light detection device 1, the power supply 26 is connected to the cathode electrode 21c of the first PD 21, and the cathode electrode 22c of the second PD 22 is connected to the anode electrode 21a of the first PD 21. Thereby, since the signal output unit 31 can be connected to the second PD 22 without going through the first PD 21 functioning as a switch, it is possible to prevent noise from being carried in a detection signal which is output from the signal output unit 31. In addition, it is possible to achieve the facilitation of manufacturing of the light detection unit 2 and the simplification of its structure. Further, the power supply 26 applies a reverse bias to the first PD 21 and the second PD 22, whereby it is possible to realize control of output of a detection signal at a high speed with a simple configuration. Meanwhile, the switch is normally disposed between the photodiode for detection and the signal output unit. According to the configuration of the light detection unit 2, it is possible to connect the signal output unit 31 to the second PD 22 without going through the first PD 21 functioning as a switch. This is an extremely effective configuration, as described above, in that it is possible to prevent noise from being carried in a detection signal which is output from the signal output unit 31.

In addition, in the light detection device 1, the first light source 24 is a semiconductor laser or a light-emitting diode. Thereby, it is possible to modulate the first pulsed light L1 at a frequency of 10 KHz or higher.

In addition, in the light detection device 1, the first light source 24 outputs the first pulsed light L1 at a frequency of 10 KHz or higher. Thereby, it is possible to appropriately acquire, for example, information relating to a distance d to the object OJ.

In addition, in the light detection device 1, the center wavelength of light to which the second PD 22 is sensitive deviates from the center wavelength of light to which the first PD 21 is sensitive. Furthermore, the first PD 21 and the first light source 24 are accommodated in the housing 25, and the plurality of second PDs 22 are disposed outside the housing 25. Thereby, it is possible to prevent the first pulsed light L1 from serving as noise in each of the plurality of second PDs 22.

In addition, in the light detection device 1, the semiconductor substrate constituting the first PD 21 is a silicon substrate, and the semiconductor substrate constituting the second PD 22 is a compound semiconductor substrate. Thereby, it is possible to detect light having a wavelength of approximately 1.5 μm in the second PD 22 while preventing the first pulsed light L1 from serving as noise in the second PD 22.

In addition, in the light detection device 1, each of the plurality of second PDs 22 connected in parallel to each other is connected in series to one first PD 21, the signal output unit 31 outputs a current that has flowed through each of a plurality of second PDs 21 as a detection signal, and the signal processing unit including the plurality of signal processing circuits 23 acquires a current that has flowed through each of the plurality of second PDs 22 as a detection signal. Thereby, it is possible to acquire a distance image of the object OJ while suppressing the complication of a configuration.

In addition, in the light detection device 1, the plurality of light detection units 2u including one first PD 21 and the plurality of second PDs 22 are constituted. In order to output a detection signal from each of the plurality of second PDs 22, a current equal to or more than the sum of currents flowing through the plurality of second PDs 22 is required to be able to flow through the first PD 21. Consequently, in the light detection device 1, one first PD 21 is provided for every predetermined number of second PDs 22 out of the total number of second PDs 22 instead of the total number of second PDs 22. Thereby, it is possible to reduce a load occurring in the first PD 21, and to properly bring each of the plurality of light detection units 2u into operation.

In addition, the light detection device 1 includes the light detection unit 2 and the second light source 3 that outputs the second pulsed light L2 to which the second PD 22 is sensitive. Thereby, it is possible to acquire information relating to the distance d to the object OJ, as in a calculation example to be described next, by irradiating the object OJ with the second pulsed light L2 in a state where the first PD 21 is irradiated with the first pulsed light L1 and causing the second pulsed light L2 reflected from the object to be incident on the plurality of second PDs 22.

Figure 3:
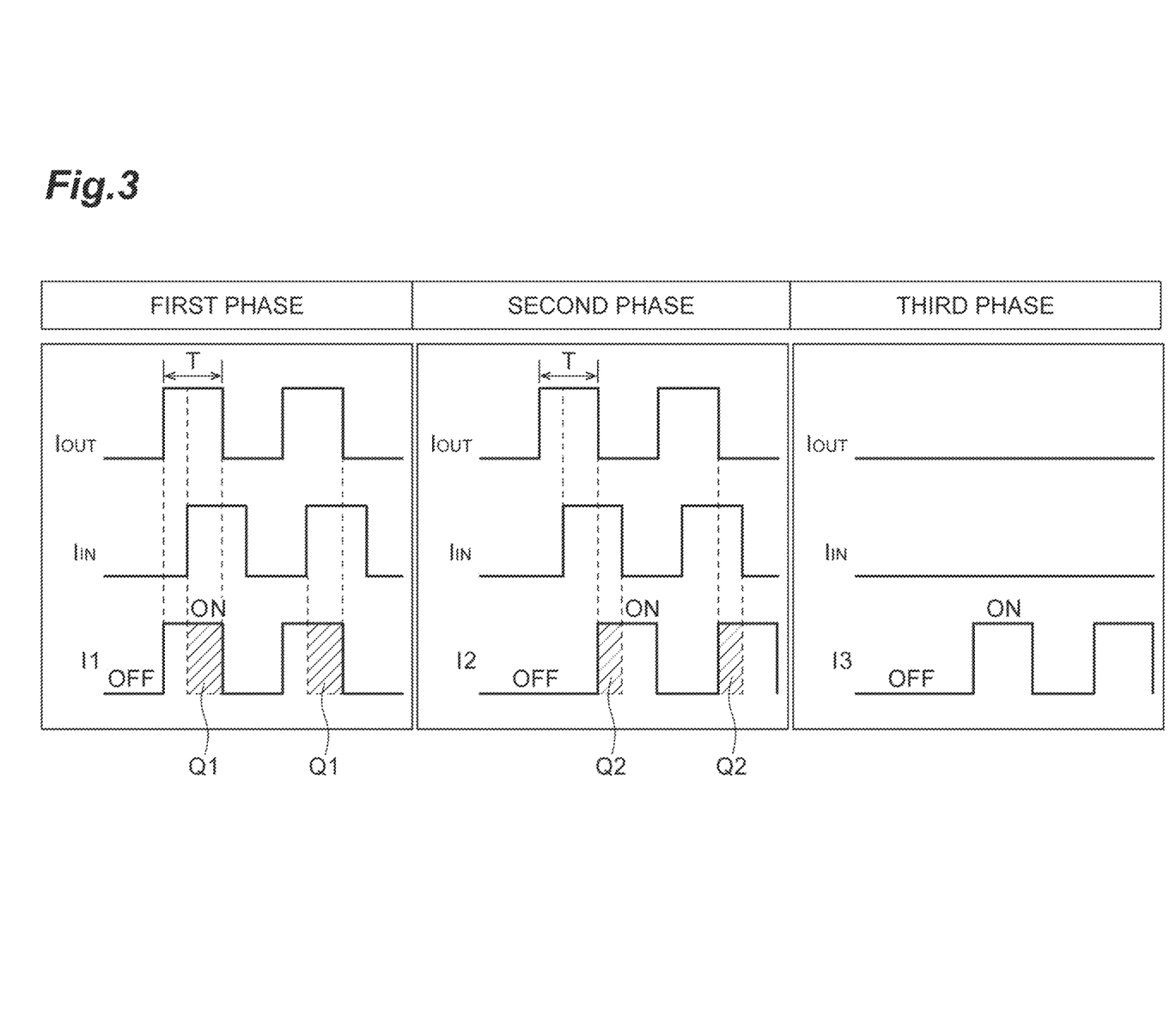
FIG. 3 is a timing diagram for acquiring information relating to a distance to an object.

A calculation example of the distance d to the object OJ will be described with reference to FIG. 3. FIG. 3 shows an intensity signal $I_{OUT}$ of the second pulsed light L2 which is output from the second light source 3, an intensity signal $I_{IN}$ of the second pulsed light L2 which is reflected from the object OJ and is incident on the second PD 22, an intensity signal I1 of the first pulsed light L1 which is output from the first light source 24 in a first phase, an intensity signal I2 of the first pulsed light L1 which is output from the first light source 24 in a second phase, and an intensity signal I3 of the first pulsed light L1 which is output from the first light source 24 in a third phase. Meanwhile, in this calculation example, attention is focused on any one second PD 22.

In the first phase, an output voltage signal $V1_{OUT}$ is acquired in a state in which the second pulsed light L2 is output from the second light source 3 with the intensity signal $I_{OUT}$ and the first pulsed light L1 is output from the first light source 24 with the intensity signal I1. The pulse width T of the intensity signal $I_{OUT}$ is set in accordance with a distance to be measured at, for example, 30 ns (measurable distance: ~4.5 m), 40 ns (measurable distance: ~ 6.0 m), or 60 ns (measurable distance: ~9.0 m). The intensity signal I1 is an intensity signal having the same period, pulse width and phase as the intensity signal $I_{OUT}$, and can be regarded as the intensity signal of the first pulsed light L1 incident on the first PD 21. In this case, since the second PD 22 outputs a detection signal only for a period in which the output value of the first pulsed light L1 incident on the first PD 21 is ON, the output voltage signal $V1_{OUT}$ corresponds to an integrated value of the amount of charge Q1 at a portion where the pulse of the intensity signal $I_{IN}$ and the pulse of the intensity signal I1 overlap each other.

In the second phase, an output voltage signal $V2_{OUT}$ is acquired in a state in which the second pulsed light L2 is output from the second light source 3 with the intensity signal $I_{OUT}$ and the first pulsed light L1 is output from the first light source 24 with the intensity signal I2. The intensity signal I2 is the same intensity signal as the intensity signal I1 except that its phase is shifted by 180°, and can be regarded as the intensity signal of the first pulsed light L1 incident on the first PD 21. In this case, since the second PD 22 outputs a detection signal only for a period in which the output value of the first pulsed light L1 incident on the first PD 21 is ON, the output voltage signal $V2_{OUT}$ corresponds to an integrated value of the amount of charge Q2 at a portion where the pulse of the intensity signal $I_{IN}$ and the pulse of the intensity signal I2 overlap each other.

In the third phase, an output voltage signal $V3_{OUT}$ is acquired in a state in which the second pulsed light L2 is not output from the second light source 3 and the first pulsed light L1 is output from the first light source 24 with the intensity signal I3. In this case, since the second PD 22 outputs a detection signal only for a period in which the output value of the first pulsed light L1 incident on the first PD 21 is ON, the output voltage signal $V3_{OUT}$ corresponds to an integrated value of the amount of charge at a portion where the intensity signal of disturbance light, if there is any, and the pulse of the intensity signal I3 overlap each other.

In a case where the first phase, the second phase and the third phase described above are performed for each second PD 22, the control unit 4 calculates the distance d to the object OJ on the basis of the output voltage signals $V1_{OUT}$, $V2_{OUT}$, and $V3_{OUT}$ for each second PD 22. The distance d is represented by Expression (1). In Expression (1), c is the speed of light.

[Expression 1]

$$d = \frac{c}{2} \times T \times \frac{(V2_{OUT} - V3_{OUT})}{(V1_{OUT} - V3_{OUT}) + (V2_{OUT} - V3_{OUT})} \quad (1)$$

As described above, in the light detection device 1, it is possible to cause the light detection unit 2 to perform a switching operation (fluctuation operation) in the order of several tens of ns. In addition, in the light detection device 1, the second light source 3 is a light source that emits the second pulsed light L2 having a wavelength of approximately 1.5 μm, and the plurality of second PDs 22 are InGaAs area sensors with sufficient sensitivity to the second pulsed light L2 having a wavelength of approximately 1.5 μm. Thereby, it becomes easier to acquire a distance image of the object OJ, for example, even in fog or smoke. Meanwhile, the above-described calculation example is merely an example, and the information relating to the distance d to the object OJ can be acquired by any of various known calculations.

Figure 4:
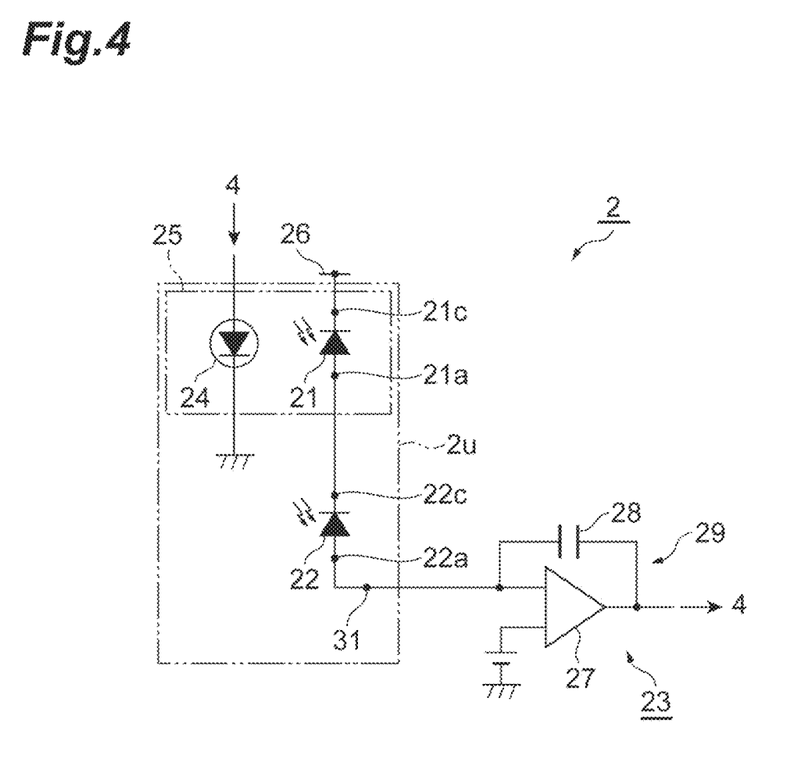
FIG. 4 is a configuration diagram of a light detection unit of a modification example.

The present disclosure is not limited to the above-described embodiment. For example, the plurality of second PDs 22 may be arranged one-dimensionally to constitute a linear sensor. In addition, as shown in FIG. 4, one second PD 22 may be connected in series to one first PD 21. In that case, it is also possible to realize control of output of a detection signal at a high speed with a simple configuration. In addition, in that case, it is also possible to acquire information relating to the distance d to the object OJ.

Figure 5:
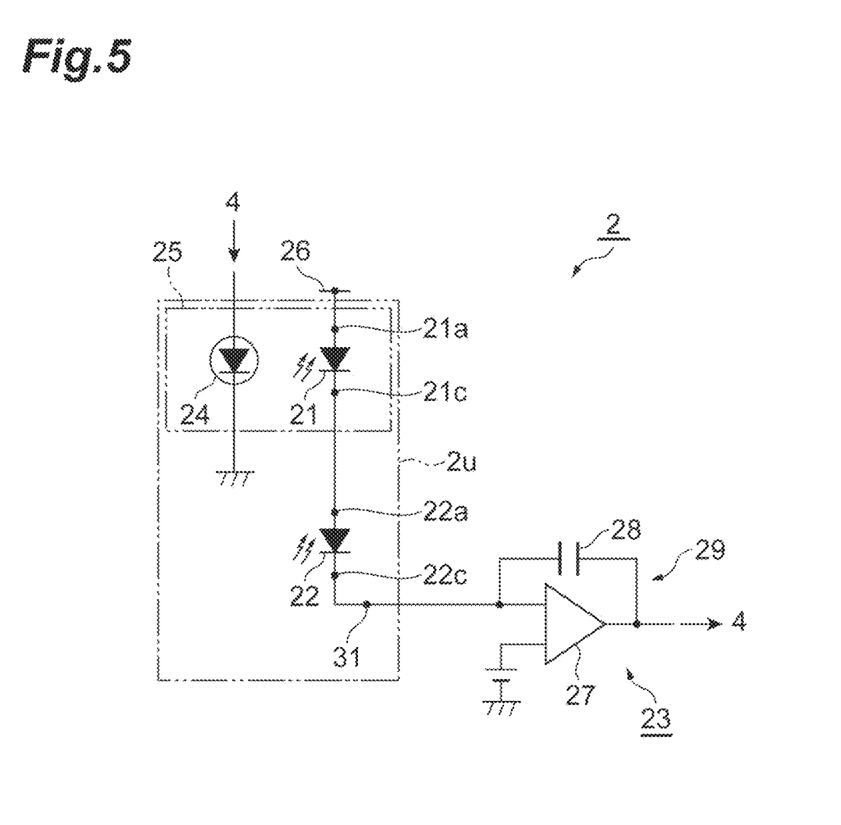
FIG. 5 is a configuration diagram of a light detection unit of a modification example.

In addition, in the above-described embodiment, the power supply 26 is connected to the cathode electrode 21c of the first PD 21, and the cathode electrode 22c of the second PD 22 is connected to the anode electrode 21a of the first PD 21. However, in a case where the power supply 26 applies a reverse bias to the first PD 21 and the second PD 22, for example, by applying a positive voltage, the power supply 26 may be connected to the cathode electrode 22c of the second PD 22, and the cathode electrode 21c of the first PD 21 may be connected to the anode electrode 22a of the second PD 22. In addition, in a case where the power supply 26 applies a reverse bias to the first PD 21 and the second PD 22, for example, by applying a negative voltage, as shown in FIG. 5, the power supply 26 may be connected to the anode electrode 21a of the first PD 21, and the anode electrode 22a of the second PD 22 may be connected to the cathode electrode 21c of the first PD 21, or the power supply 26 may be connected to the anode electrode 22a of the second PD 22, and the anode electrode 21a of the first PD 21 may be connected to the cathode electrode 22c of the second PD 22. In either case, the power supply 26 applies a reverse bias to the first PD 21 and the second PD 22, whereby it is possible to realize control of output of a detection signal at a high speed with a simple configuration.

In addition, in the above-described embodiment, the first PD 21 is a Si photodiode, and the second PD 22 is an InGaAs photodiode, but each of the first PD 21 and the second PD 22 may be another photodiode. A combination of the first light source 24 and the first PD 21 and a combination of the second light source 3 and the second PD 22 can also be appropriately selected.

In addition, in a case where the first PD 21 and the first light source 24 are accommodated in the housing 25, the first PD 21 and the second PD 22 may be photodiodes of the same type. In addition, in a case where the center wavelength of light to which the second PD 22 is sensitive deviates from the center wavelength of light to which the first PD 21 is sensitive, the first PD 21 and the first light source 24 may not be accommodated in the housing 25. In a case where the a portion of the wavelength region of light to which the second PD 22 is sensitive overlaps a portion of the wavelength region of light to which the first PD 21 is sensitive, a filter that cuts light of a portion of the wavelength region may be provided on at least one of the first PD 21 side and the second PD 22 side.

In addition, the signal processing circuit 23 may include at least an integration circuit. For example, the signal processing circuit 23 may be a source follower type integration circuit or the like.

In addition, various materials and shapes can be applied to the components of the above-described light detection device 1 without being limited to the above-described materials and shapes. In addition, the components in the above-described embodiment or modification example can be arbitrarily applied to components in other embodiments or modification examples.

In addition, the light detection device 1 may not include the second light source 3. An example of the light detection device 1 in that case to be exemplified includes an infrared image sensor having a global shutter operation (high-speed shutter operation) required for detecting high-speed objects and signals, or the like.

A light detection device of an aspect of the present disclosure includes a first photodiode, a second photodiode connected in series to the first photodiode, a first light source configured to output first pulsed light to which the first photodiode is sensitive, and a signal output unit configured to output a current as a detection signal, the current that flow through the second photodiode.

In this light detection device, for a period in which the output value of the first pulsed light is OFF in a state where the first photodiode is irradiated with the first pulsed light, carriers (electrons and holes) are not generated in the first photodiode. Therefore, even when carriers have been generated in the second photodiode due to the incidence of light to be detected, a current does not flow through the second photodiode. That is, for a period in which the output value of the first pulsed light is OFF, it is possible not to output a current that has flowed through the second photodiode as a detection signal from the signal output unit. On the other hand, for a period in which the output value of first pulsed light is ON in a state where the first photodiode is irradiated with the first pulsed light, carriers are generated in the first photodiode. Therefore, when carriers are generated in the second photodiode due to the incidence of light to be detected, a current flows through the second photodiode. That is, for a period in which the output value of the first pulsed light is ON, it is possible to output a current that has flowed through the second photodiode as a detection signal from the signal output unit. Here, the first pulsed light can be modulated at a frequency of 10 KHz or higher. Thus, according to this light detection device, it is possible to realize control of output of a detection signal at a high speed with a simple configuration. Meanwhile, the output value of the first pulsed light for the period of OFF is not limited to only 0, and may be an output value lower than the output value of the first pulsed light for the period of ON and an output value for which carriers are not generated in the first photodiode.

The light detection device of an aspect of the present disclosure may further include a signal processing unit configured to acquire the detection signal that is output from the signal output unit. According to this, it is possible to process the detection signal which is output from the signal output unit.

In the light detection device of an aspect of the present disclosure, the first photodiode may include a first electrode to which a power supply is connected and a second electrode to which the second photodiode is connected. According to this, since the signal output unit can be connected to the second photodiode without going through the first photodiode functioning as a switch, it is possible to prevent noise from being carried in a detection signal which is output from the signal output unit.

In the light detection device of an aspect of the present disclosure, the first electrode may be a cathode electrode of the first photodiode, the second electrode may be an anode electrode of the first photodiode, a cathode electrode of the second photodiode may be connected to the anode electrode of the first photodiode, and signal output unit may be connected to an anode electrode of the second photodiode. Alternatively, in the light detection device of an aspect of the present disclosure, the first electrode may be an anode electrode of the first photodiode, the second electrode may be a cathode electrode of the first photodiode, an anode electrode of the second photodiode may be connected to the cathode electrode of the first photodiode, and the signal output unit may be connected to a cathode electrode of the second photodiode. In either case, the power supply applies a reverse bias to the first photodiode and the second photodiode, whereby it is possible to realize control of output of a detection signal at a high speed with a simple configuration.

In the light detection device of an aspect of the present disclosure, the first light source may be a semiconductor laser or a light-emitting diode. According to this, the first pulsed light can be modulated at a frequency of 10 KHz or higher.

In the light detection device of an aspect of the present disclosure, the first light source may output the first pulsed light at a frequency of 10 KHz or higher. According to this, it is possible to appropriately acquire, for example, information relating to a distance to an object.

The light detection device of an aspect of the present disclosure may further include a light-shielding housing accommodating the first photodiode and the first light source, and the second photodiode may be disposed outside the housing. According to this, it is possible to prevent the first pulsed light from serving as noise in the second photodiode.

In the light detection device of an aspect of the present disclosure, a center wavelength of light to which the second photodiode is sensitive may deviate from a center wavelength of light to which the first photodiode is sensitive. According to this, it is possible to prevent the first pulsed light from serving as noise in the second photodiode. Meanwhile, a portion of the wavelength region of light to which the second photodiode is sensitive may overlap a portion of the wavelength region of light to which the first photodiode is sensitive.

In the light detection device of an aspect of the present disclosure, a semiconductor substrate constituting the first photodiode may be a silicon substrate, and a semiconductor substrate constituting the second photodiode may be a compound semiconductor substrate. According to this, it is possible to detect light having a wavelength of approximately 1.5 µm in the second photodiode while preventing the first pulsed light from serving as noise in the second photodiode.

In the light detection device of an aspect of the present disclosure, the first photodiode may be one first photodiode, the second photodiode may be a plurality of second photodiodes, each of the plurality of second photodiodes connected in parallel to each other may be connected in series to the one first photodiode, and the signal output unit may output a current as a detection signal, the current that flowe through each of the plurality of second photodiodes. According to this, the light detection device can be used for the acquisition of a distance image while suppressing the complication of its configuration.

In the light detection device of an aspect of the present disclosure, a plurality of light detection units including the one first photodiode and the plurality of second photodiodes may be constituted. According to this, it is possible to reduce a load occurring in the first photodiode, and to properly bring each of the plurality of light detection units into operation.

The light detection device of an aspect of the present disclosure may further include a second light source configured to output second pulsed light to which the second photodiode is sensitive. According to this, in a state in which the first photodiode is irradiated with the first pulsed light, an object is irradiated with the second pulsed light and the second pulsed light reflected from the object is caused to be incident on the second photodiode, whereby it is possible to acquire information relating to a distance to the object.

According to the present disclosure, it is possible to provide a light detection device that makes it possible to realize control of output of a detection signal at a high speed with a simple configuration.

What is claimed is:

1. A light detection device comprising:
    a first photodiode;
    a second photodiode connected in series to the first photodiode;
    a first light source configured to output first pulsed light to which the first photodiode is sensitive; and
    a signal output unit configured to output a current as a detection signal, the current that flow through the second photodiode.

2. The light detection device according to claim 1, further comprising a signal processing unit configured to acquire the detection signal that is output from the signal output unit.

3. The light detection device according to claim 1, wherein the first photodiode includes a first electrode to which a power supply is connected and a second electrode to which the second photodiode is connected.

4. The light detection device according to claim 3, wherein the first electrode is a cathode electrode of the first photodiode,
    the second electrode is an anode electrode of the first photodiode,
    a cathode electrode of the second photodiode is connected to the anode electrode of the first photodiode, and
    the signal output unit is connected to an anode electrode of the second photodiode.

5. The light detection device according to claim 3, wherein the first electrode is an anode electrode of the first photodiode,
    the second electrode is a cathode electrode of the first photodiode,
    an anode electrode of the second photodiode is connected to the cathode electrode of the first photodiode, and
    the signal output unit is connected to a cathode electrode of the second photodiode.

6. The light detection device according to claim 1, wherein the first light source is a semiconductor laser or a light-emitting diode.

7. The light detection device according to claim 6, wherein the first light source outputs the first pulsed light at a frequency of 10 KHz or higher.

8. The light detection device according to claim 1, further comprising a light-shielding housing accommodating the first photodiode and the first light source,
    wherein the second photodiode is disposed outside the housing.

9. The light detection device according to claim 1, wherein a center wavelength of light to which the second photodiode is sensitive deviates from a center wavelength of light to which the first photodiode is sensitive.

10. The light detection device according to claim 9, wherein a semiconductor substrate constituting the first photodiode is a silicon substrate, and
    a semiconductor substrate constituting the second photodiode is a compound semiconductor substrate.

11. The light detection device according to claim 1, wherein the first photodiode is one first photodiode,
    the second photodiode is a plurality of second photodiodes,
    each of the plurality of second photodiodes connected in parallel to each other is connected in series to the one first photodiode, and the signal output unit outputs a current as a detection signal, the current that flow through each of the plurality of second photodiodes.

12. The light detection device according to claim 11, wherein a plurality of light detection units including the one first photodiode and the plurality of second photodiodes are constituted.

13. The light detection device according to claim 1, further comprising a second light source configured to output second pulsed light to which the second photodiode is sensitive.

\* \* \* \* \*